United States Patent
Engel

(10) Patent No.: US 6,365,721 B1
(45) Date of Patent: Apr. 2, 2002

(54) WATER-SOLUBLE MONOAZO DYES, THEIR PREPARATION AND USE

(75) Inventor: Aloys Engel, Leverkusen (DE)

(73) Assignee: DyStar Textilfarben GmbH & Co., Deutschland KG (DE)

( * ) Notice: Subject to any disclaimer, the term of this patent is extended or adjusted under 35 U.S.C. 154(b) by 0 days.

(21) Appl. No.: 09/956,173

(22) Filed: Sep. 18, 2001

(30) Foreign Application Priority Data

Sep. 23, 2000 (DE) .......................................... 100 47 234

(51) Int. Cl.$^7$ .............................................. C07C 245/00

(52) U.S. Cl. .............................. 534/872; 534/879; 8/682

(58) Field of Search ................................. 534/872, 879; 8/682

(56) References Cited

U.S. PATENT DOCUMENTS 4,405,329 A * 9/1983 Abel et al. ...................... 8/527

* cited by examiner

*Primary Examiner*—Fiona T. Powers
(74) *Attorney, Agent, or Firm*—Connolly Bove Lodge & Hutz LLP

(57) ABSTRACT

Water-soluble monoazo dyes, their preparation and use Dyes of the formula (1):

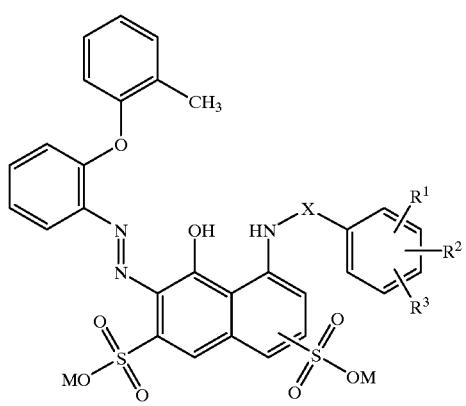

(1)

in which

M is hydrogen, ammonium, an alkali metal or the equivalent of an alkaline earth metal;

X is sulfonyl or —COCH$_2$O—;

R$^1$, R$^2$ and R$^3$ independently of one another are hydrogen, halogen, for example fluorine, chlorine or bromine, unsubstituted or chloro- or hydroxy-substituted C$_1$ to C$_4$ alkoxy, for example 2-chloroethoxy or 2-hydroxyethoxy, and the sulfo group is in position 3 or 4 to the NH group, their preparation, and their use for dyeing or printing carboxamido-containing materials.

13 Claims, No Drawings

WATER-SOLUBLE MONOAZO DYES, THEIR PREPARATION AND USE

DESCRIPTION

Water-soluble monoazo dyes, their preparation and use

The present invention relates to novel water-soluble monoazo dyes, to processes for preparing them and to their use for dyeing and printing carboxamido-containing materials, especially carboxamido-containing fiber materials.

The patents DE-B 728485, DE-B 731677, DE-B 731770, and GB 483442 describe monoazo dyes for use as dyes for natural and synthetic carboxamide-containing fiber materials, such as wool, silk or polyamide fibers, for example, nylon 6 or nylon 6,6. However, these dyes possess certain performance defects, such as unsatisfactory wet fastness and perspiration fastness properties and unsatisfactory light fastness properties.

For the present invention it has now been found that dyes of the formula (I) surprisingly have much better wet fastness and perspiration fastness properties and better light fastness properties.

The invention accordingly provides dyes of the formula (1):

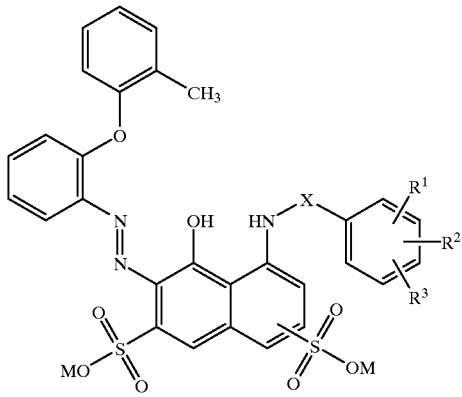

(1)

in which

X is sulfonyl or —COCH$_2$O—;

M is hydrogen, ammonium, an alkali metal or the equivalent of an alkaline earth metal;

$R^1$, $R^2$ and $R^3$ independently of one another are hydrogen, halogen, for example fluorine, chlorine or bromine, unsubstituted or chloro- or hydroxy-substituted C$_1$ to C$_4$ alkyl, for example 2-chloroethyl or 2-hydroxyethyl, unsubstituted or chloro- or hydroxy-substituted C$_1$ to C$_4$ alkoxy, for example 2-chloroethoxy or 2-hydroxyethoxy, and the sulfo group is in position 3 or 4 to the NH group.

Preferred embodiments of the dyes of the invention are dyes of the formula (2)

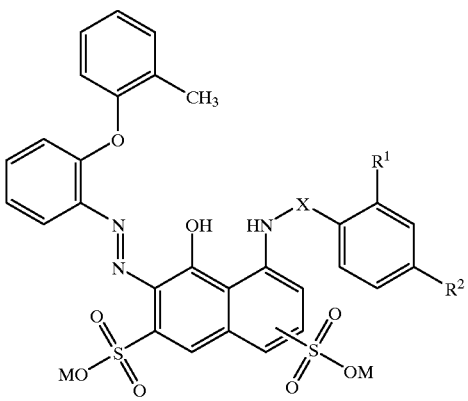

(2)

in which

M is hydrogen, ammonium, an alkali metal or the equivalent of an alkaline earth metal, X is sulfonyl or —COCH$_2$O— and $R^1$ and $R^2$ independently of one another are hydrogen, chlorine or C$_1$ to C$_4$ alkyl and the sulfo group is in position 3 or 4 to the NH group.

Especially preferred embodiments of the dyes of the invention are dyes of the formula (2) in which X is —COCH$_2$O— and $R^1$ and $R^2$ independently of one another are hydrogen or chlorine, and also dyes of the formula (2) in which X is sulfonyl and $R^1$ and $R^2$ are hydrogen or methyl and the sulfo group is in each case in position 3 or 4 to the NH group.

The dyes of the invention may be prepared conventionally, for example by means of the customary diazotization and coupling reactions in a manner familiar to the skilled worker and with the proportions required for the purpose.

For example, it is possible by starting from a compound of the formula (3)

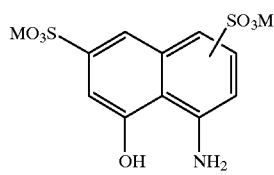

(3)

and condensing it with acid chlorides of the formula (4)

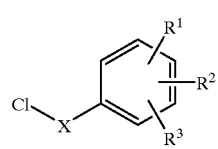

(4)

in which M, X, $R^1$, $R^2$ and $R^3$ are as defined above to prepare the coupling component of the formula (5)

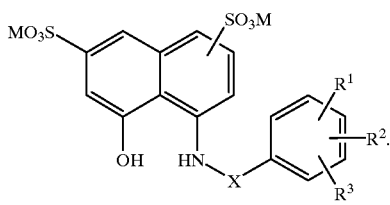

By diazotizing the amine of the formula (6)

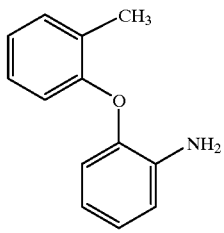

and coupling the product onto the coupling component of the formula (5), the dyes of the formula (1) are accessible.

The compounds of the invention of the formula (1) may be deposited and isolated from the aqueous synthesis solutions or suspensions by generally common methods for water-soluble compounds, for example by precipitation from the reaction medium using, an electrolyte, such as sodium chloride or potassium, chloride, or by evaporative concentration of the reaction solution or suspension, for example by spray drying.

The dyes of the invention may be present in the form of a solid or liquid preparation. They generally comprise the electrolyte salts customary in the case of water-soluble dyes, such as sodium chloride, potassium chloride, and sodium sulfate, and may further comprise the ionic standardizers customary for acid dyes, such as naphthalenesulfonic acid-formaldehyde condensates, or nonionic standardizers customary for acid dyes, such as dextrin, and the assistants customary for commercial dyes.

In general, the dyes of the invention are in the form of powders or granules with a dye content of from 10 to 90% by weight, based on the dye powder or the preparation, preferably with a dye content of 30–80% by weight.

The dyes of the invention possess valuable performance properties. They are used for dyeing or printing carboxamido-containing materials by conventional methods, examples of said materials being synthetic and natural polyamides and polyurethanes, particularly in the form of fibers, for example wool and other animal hairs, silk, nylon 6,6 and nylon 6, nylon 11, in the form of sheetlike structures, such as leather, or of films, such as those of polyamide, or in the mass, such as polyamide and polyurethane.

These materials are preferably employed in the form of fiber materials, particularly in the form of textile fibers, such as woven fabrics or yarns, such as in the form of hanks or wound packages. On said materials the dyes of the invention produce red dyeings having high brightness and levelness, and also good all-round fastness properties, examples being wet fastness and perspiration fastness properties, and very good light fastness properties.

Accordingly, the present invention also provides the use of the dyes of the invention for dyeing or printing these materials and to processes for dyeing or printing such materials in conventional procedures, using the dyes of the invention as colorants.

The dyes of the invention may be applied to and fixed on the aforementioned substrates, especially the aforementioned fiber materials, by the application techniques which are known for water-soluble dyes.

For instance, dyeings having very good fastness properties are obtained from them by the exhaust method from a long liquor. Dyeing is preferably conducted in an aqueous bath at temperatures between 70 and 110° C., if desired at a temperature of up to 130° C. under pressure, and in the presence if desired of customary dyeing assistants. One possible procedure is to introduce the material into the warm bath, gradually to heat the bath to the desired dyeing temperature, and to complete the dyeing process at this temperature.

Moreover, wool which has been given a nonfelting or low-felting finish (cf., for example, H. Rath, Lehrbuch der Textilchemie, Springer-Verlag, 3rd Edition (1972), pp. 295–299, especially the finish by the Hercosett process (p. 298); J. Soc. Dyers and Colourists 1972, 93–99, and 1975, 33–44) can be dyed with very good fastness properties.

The process of dyeing on wool is carried out here in a conventional manner from an acidic medium. For instance, acetic acid and/or ammonium sulfate or acetic acid and ammonium acetate or sodium acetate may be added to the dyebath in order to obtain the desired pH. To obtain a dyeing of acceptable levelness, it is advisable to add customary levelling assistants, based for example on a reaction product of an alkylarylamine or of a sulfonated alkylamine with ethylene oxide. For example, the dyes of the invention are preferably subjected to the exhaust process initially from an acidic dyebath.

The procedure described here also applies to the production of dyeings on fiber materials composed of other natural polyamides and of synthetic polyamides.

In general, the material to be dyed is introduced into the bath at a temperature of about 40° C. and agitated therein for some time, the dyebath is then adjusted to the desired weakly acidic—preferably, weakly acetic acid—pH, and the actual dyeing is conducted at a temperature between 70 and 110° C. The dyeings are preferably performed at boiling temperature or, in closed dyeing apparatus, at temperatures up to 106° C.

Since the water solubility of the dyes of the invention is very good, they may also be used with advantage in customary continuous dyeing processes. Furthermore, the dyes of the invention are readily combinable with other dyes.

When the dyes of the invention are used to print carboxamide-containing materials such as wool, silk, nylon 6 or nylon 6,6, the print pastes produced conventionally from the dyes, and comprising, inter alia, solubilizers, based for example on fatty alcohol ethoxylates, and thickeners, based for example on galactomannan derivatives, are applied by known techniques and fixed, for example using saturated steam at 102° C.

The examples below illustrate the invention. The percentages are by weight unless noted otherwise.

EXAMPLE 1

Diazotization 200.6 g of 2-o-tolyloxyaniline (99.2%) are dissolved in 900 ml of water and 280 ml of 30% hydrochloric acid. Addition of 1000 g of ice is followed by partial precipitation of the amine hydrochloride. 231 ml of sodium nitrite solution (300 g/l) is added dropwise at 0–5° C. over the course of 30 minutes and the mixture is stirred for 1 hour. The excess nitrite is destroyed by adding a little amidosulfonic acid solution.

Coupling 991 g of 1-( N-2,4-dichlorophenoxyacetyl)amino-8-hydroxynaphthalene4,6-disulfonic acid (55%) are stirred in 5500 ml of water. The pH is adjusted to 7 using about 5 ml of sodium hydroxide solution (400 g/l). Following the addition of 27.5 g of sodium bicarbonate the diazo solution is pumped in over the course of 30 minutes, during which the pH is held at 8.5–9 by dropwise addition of 190 ml of sodium hydroxide solution (400 g/l). Following the addition of 696 g of sodium chloride, the mixture is stirred at room temperature for 3 hours. The dye is isolated by filtration to give, after drying at 50° C. in vacuo, 932 g of dry dye (A) which dyes wool in a brilliant red.

(A)

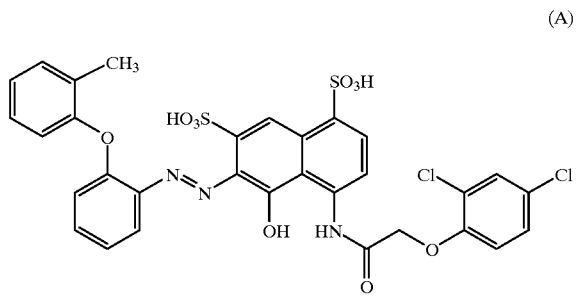

If the coupling component stated in example 1 is replaced by the general coupling component (5), the dyes listed in the table below are obtained, and dye wool or nylon brilliant red:

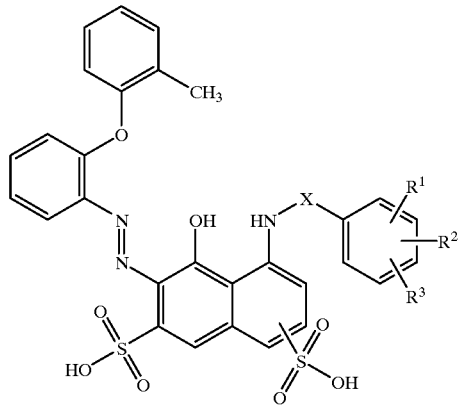

| Example | X | $R^1$ | $R^2$ | $R^3$ | Position-$SO_3H$ |
|---|---|---|---|---|---|
| 2 | —COCH$_2$O— | 2-Cl | 4-Cl | H | 3 |
| 3 | —COCH$_2$O— | 2-Cl | H | H | 4 |
| 4 | —COCH$_2$O— | 2-Cl | H | H | 3 |
| 5 | —COCH$_2$O— | H | H | H | 4 |
| 6 | —COCH$_2$O— | H | H | H | 3 |
| 7 | —COCH$_2$O— | H | 4-CH$_3$ | H | 4 |
| 8 | —COCH$_2$O— | H | 4-CH$_3$ | H | 3 |
| 9 | —COCH$_2$O— | H | 4-OCH$_3$ | H | 4 |
| 10 | —COCH$_2$O— | H | 4-OCH$_3$ | H | 3 |
| 11 | —SO$_2$— | H | H | H | 4 |
| 12 | —SO$_2$— | H | H | H | 3 |
| 13 | —SO$_2$— | H | 4-CH$_3$ | H | 4 |
| 14 | —SO$_2$— | H | 4-CH$_3$ | H | 3 |

What is claimed is:
1. A dye of the formula (1):

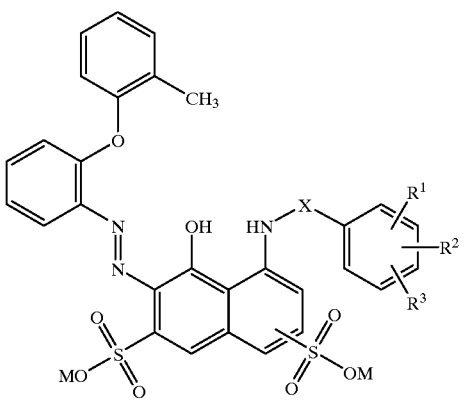

(1)

in which
M is hydrogen, ammonium, an alkali metal or the equivalent of an alkaline earth metal;
X is sulfonyl or —COCH$_2$O—;
$R^1$, $R^2$ and $R^3$ independently of one another are hydrogen, halogen, unsubstituted or chloro- or hydroxy-substituted $C_1$ to $C_4$ alkyl, unsubstituted or chloro- or hydroxy-substituted $C_1$ to $C_4$ alkoxy, and the sulfo group is in position 3 or 4 to the NH group.

2. A dye as claimed in claim 1 wherein X is —COCH$_2$O— and $R^1$ and $R^2$ are hydrogen or chlorine and $R^3$ is hydrogen.

3. A dye as claimed in claim 1 wherein X is sulfonyl and $R^1$ is hydrogen, $R^2$ is hydrogen or methyl, and $R^3$ is hydrogen.

4. The dye as claimed in claim 2, wherein M is hydrogen.
5. The dye as claimed in claim 3, wherein M is hydrogen.
6. A process for preparing the dye as claimed in claim 1, which comprises condensing a compound of the formula (3)

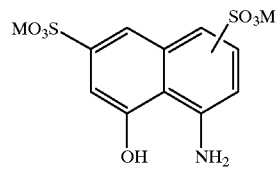

(3)

with acid chlorides of the formula (4)

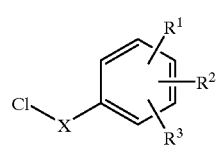

(4)

in which
M is hydrogen, ammonium, an alkali metal or the equivalent of an alkaline earth metal;
X is sulfonyl or —COCH$_2$O—;
$R^1$, $R^2$ and $R^3$ independently of one another are hydrogen, halogen, unsubstituted or chloro- or hydroxy-substituted $C_1$ to $C_4$ alkyl, unsubstituted or chloro- or hydroxy-substituted $C_1$ to $C_4$ alkoxy, to give the coupling component of the formula (5)

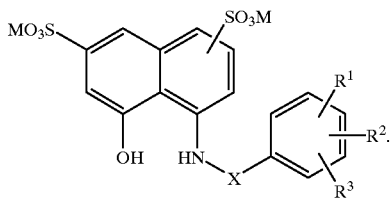
(5)

and diazotizing the amine of the formula (6)

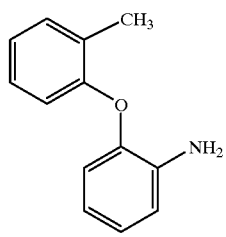
(6)

and coupling the product onto the coupling component of the formula (5).

7. The process as claimed in claim 6, wherein X is —COCH$_2$O— and R$^1$ and R$^2$ are hydrogen or chlorine and R$^3$ is hydrogen.

8. The process as claimed in claim 6, wherein X is sulfonyl and R$^1$ is hydrogen, R$^2$ is hydrogen or methyl, and R$^3$ is hydrogen.

9. The process as claimed in claim 7, wherein M is hydrogen.

10. The process as claimed in claim 8, wherein M is hydrogen.

11. A process for dyeing or printing carboxamido material, which comprises applying the dye as claimed in claim 1, in dissolved form to the material at a pH of 3 to 7 and at temperatures of 70 to 110° C.

12. The process for dyeing or printing carboxamido material, which comprises applying the dye as claimed in claim 2, in dissolved form to the material at a pH of 3 to 7 and at temperatures of 70 to 110° C.

13. The process for dyeing or printing carboxamido material, which comprises applying the dye as claimed in claim 3, in dissolved form to the material at a pH of 3 to 7 and at temperatures of 70 to–110° C.

* * * * *